(12) United States Patent
Kakadia et al.

(10) Patent No.: US 8,503,880 B2
(45) Date of Patent: Aug. 6, 2013

(54) OPTICAL TRANSPORT NETWORK DECOUPLING USING OPTICAL DATA UNIT AND OPTICAL CHANNEL LINK AGGREGATION GROUPS (LAGS)

(75) Inventors: Deepak Kakadia, Union City, CA (US); Jay Lee, San Ramon, CA (US); Thomas Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 415 days.

(21) Appl. No.: 12/972,871

(22) Filed: Dec. 20, 2010

(65) Prior Publication Data

US 2012/0155872 A1 Jun. 21, 2012

(51) Int. Cl.
*H04J 14/00* (2006.01)

(52) U.S. Cl.
USPC ............. 398/58; 398/59; 398/66; 370/258; 370/270

(58) Field of Classification Search
USPC ............. 398/58, 59, 60, 66, 67, 68, 70, 71, 398/57, 3, 4, 5, 7; 370/258, 270, 222, 223, 370/229, 230, 230.1, 231, 235, 237, 351, 385, 395.53, 403, 404, 405, 406, 424
See application file for complete search history.

(56) References Cited

U.S. PATENT DOCUMENTS

| | | | |
|---|---|---|---|
| 7,620,322 B2 * | 11/2009 | Sparks et al. | 398/49 |
| 7,990,853 B2 * | 8/2011 | Brolin | 370/229 |
| 8,009,684 B2 * | 8/2011 | Zelig et al. | 370/404 |
| 2009/0245112 A1 * | 10/2009 | Okazaki | 370/236 |
| 2010/0165831 A1 * | 7/2010 | Elie-Dit-Cosaque et al. | 370/217 |
| 2011/0075554 A1 * | 3/2011 | Holness | 370/228 |

\* cited by examiner

*Primary Examiner* — M. R. Sedighian

(57) ABSTRACT

A network device establishes first and second Ethernet link aggregation groups (LAGs) at a first access site of an optical transport network (OTN), and creates a first optical channel (OCh) LAG subpath from the first Ethernet LAG, via a second access site of the OTN, to an Ethernet LAG at a third access site of the OTN. The network device also creates a second OCh LAG subpath from the first Ethernet LAG, via a distribution site of the OTN, to the Ethernet LAG at the third access site, and creates a first optical data unit (ODUk) LAG subpath from the second Ethernet LAG to an Ethernet LAG at the second access site. The network device further creates a second ODUk LAG subpath from the second Ethernet LAG, via the distribution site and the third access site, to the Ethernet LAG at the second access site.

20 Claims, 8 Drawing Sheets

FIG. 2
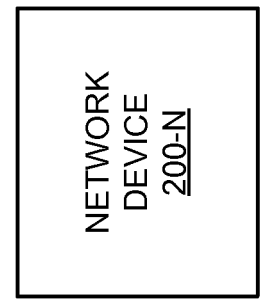
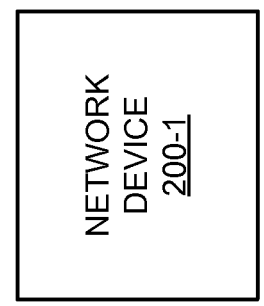

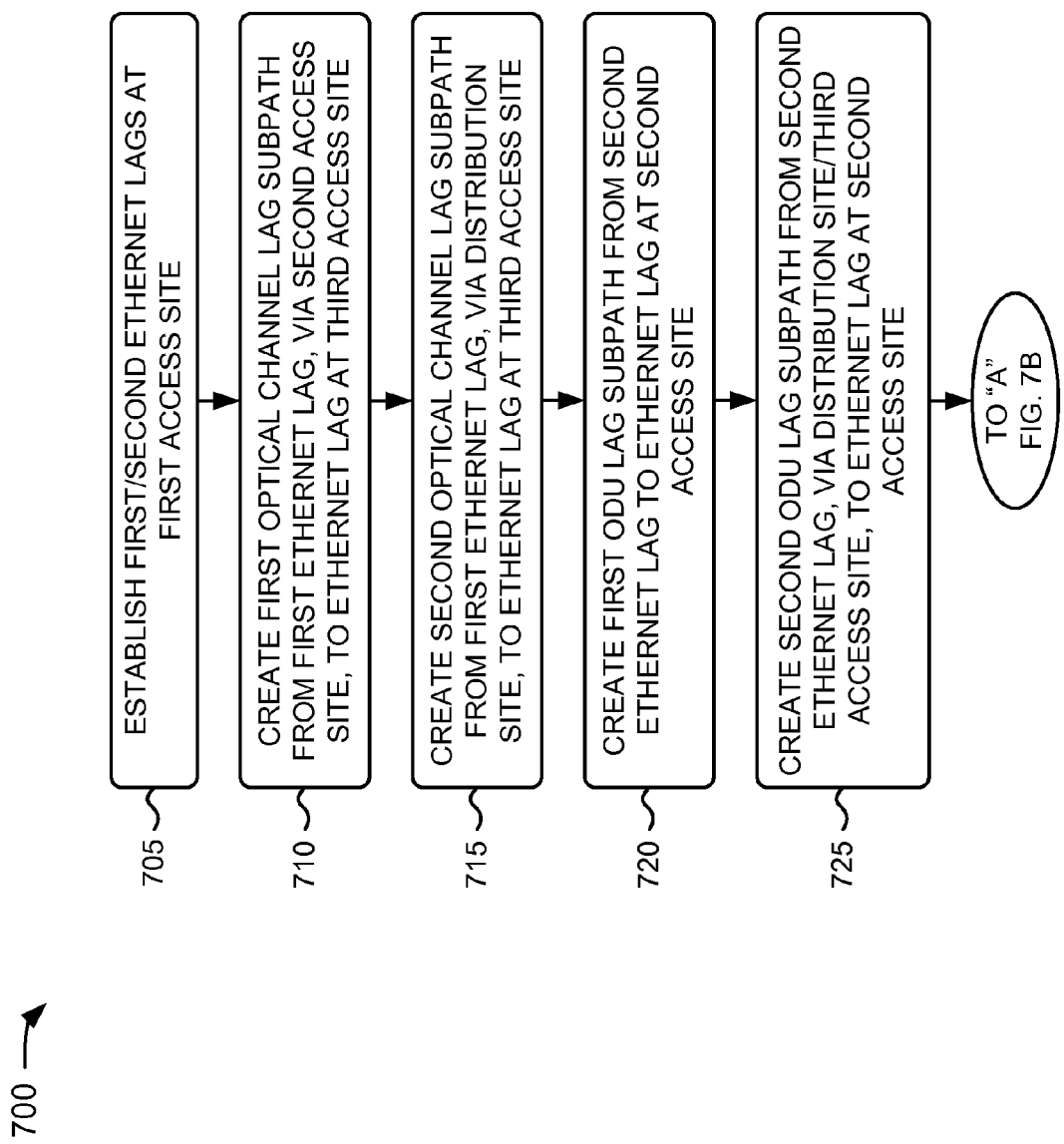

OPTICAL TRANSPORT NETWORK DECOUPLING USING OPTICAL DATA UNIT AND OPTICAL CHANNEL LINK AGGREGATION GROUPS (LAGS)

BACKGROUND

An optical transport network (OTN) includes a set of optical network elements (e.g., network devices), connected by optical fiber links, that provide transport, multiplexing, routing, management, supervision, and survivability functions for optical channels carrying optical signals. An OTN may provide transport for any digital client signal carried via any protocol that can be encapsulated in a format acceptable to the OTN. A metropolitan OTN is a geographical subset of an OTN that spans a geographical metropolitan area within an urban or suburban region, that is distinct from a core or backbone, which interconnects various metropolitan OTNs. Bandwidth requirements from end customers have increased substantially, and the resulting congestion and complexity has created a growing demand for higher bandwidth interfaces, such as interfaces provided by metropolitan OTNs. Metropolitan OTNs are inherently designed for short to medium length distances in metropolitan areas; that is, typically, within the limits of a single optical span and often less than a predetermined distance. Metropolitan OTNs are designed to provide services to a variety of customers with ranging requirements (e.g., from Digital Signal 0 (DS0) to 10 Gigabit Ethernet (10GE) services).

ITU-T G.872 defines the architecture of an OTN as including multiple layers, such as an Optical Transmission Section (OTS), an Optical Multiplex Section (OMS), and an Optical Channel (OCh). ITU-T G.709 defines the OCh layer structure and a frame format at an Optical Network Node Interface (ONNI) level. Each layer of transported information is made up of a payload and overheads. The OCh layer includes two main units (e.g., an Optical Data Unit of a particular level (k) (ODUk) and an Optical Transport Unit (OTU)), and transports payloads and associated overhead information. In particular, the purpose of the ODUk overhead is to carry information managing and monitoring an end-to-end connection crossing an OTN. The OCh layer and the ODUk layer span multiple layers, which may add to the complexity of the OTN. Furthermore, the OCh layer is an entirely optical layer, whereas the ODUk layer is not an entirely optical layer (e.g., the ODUk layer performs some electrical functions).

A link aggregation (e.g., as set forth in IEEE 802.3ad) is a computer networking term which describes using multiple links (e.g., Ethernet network cables and/or ports in parallel) as one logical port to increase the link speed beyond the limits of any one single link. Other terms used for link aggregation may include Ethernet trunking, port teaming, network interface card (NIC) bonding, link bundling, and/or a link aggregation group (LAG). A LAG will be used hereinafter to refer to link aggregation.

BRIEF DESCRIPTION OF THE DRAWINGS

FIG. 2 is a diagram of example components of an access site or a distribution site of the network depicted in FIG. 1;

FIGS. 7A and 7B depict a flow chart of an example process for optical transport network decoupling using optical data unit and optical channel link aggregation groups according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide optical transport network (OTN) decoupling using optical data unit and optical channel link aggregation groups (LAGs). The systems and/or methods may simplify construction of an OTN via the OCh and ODUk LAGs, which may prevent expansion and contraction of each layer of the OTN from having an impact on adjacent OTN layers, and may reduce tight coupling between OTN layers.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "traffic," as used herein, is intended to be broadly construed to include one or more frames, datagrams, packets, or cells; one or more fragments of a frame, one or more fragments of a datagram, one or more fragments of a packet, or one or more fragments of a cell; or another type, arrangement, or packaging of data.

Figure 1:
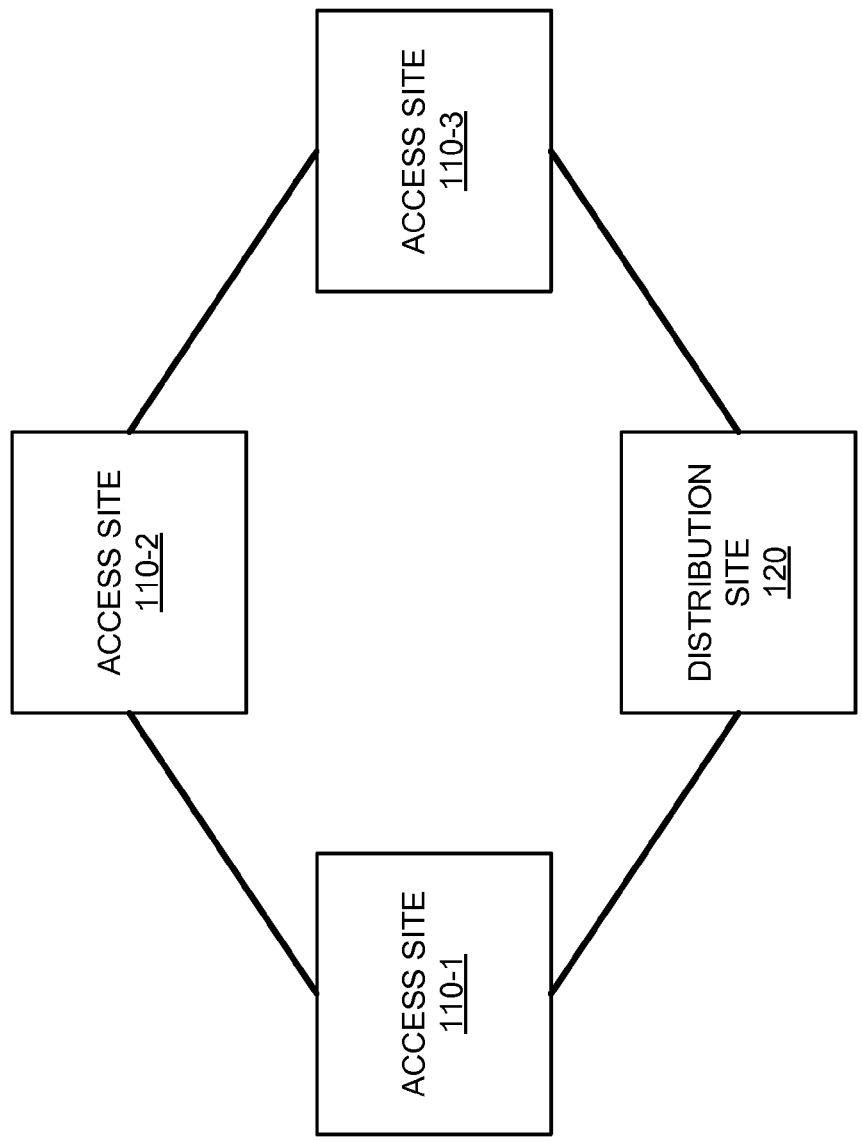
FIG. 1 is a diagram of an example network in which systems and/or methods described herein may be implemented.

FIG. 1 is a diagram of an example network 100 in which systems and/or methods described herein may be implemented. As illustrated, network 100 may include three access sites 110-1, 110-2, and 110-3 (collectively referred to herein as "access sites 110," or, in some instances, singularly as "access site 110") and a distribution site 120 interconnected by optical connections (e.g., optical fibers or some other optical communication media). Three access sites 110 and one distribution site 120 have been illustrated in FIG. 1 for simplicity. In practice, there may be more access sites 110 and/or distribution sites 120. Also, in some instances, one or more of the components of network 100 may perform one or more functions described as being performed by another one or more of the components of network 100. In one example implementation, network 100 may correspond to an OTN or a metropolitan OTN that provides transport, multiplexing, routing, management, supervision, and survivability functions for optical channels carrying optical signals.

Access site 110 may include one or more network devices, or other types of computation or communication devices, that gather, process, search, and/or provide information in a manner described herein. For example, access site 110 may include one or more network devices that enable customers (e.g., via computation or communication devices) to access network 100 so that network 100 may provide a variety of services (e.g., from DS0 to 10GE services) to the customers. In one example implementation, access site 110 may include one or more reconfigurable optical add-drop multiplexers (ROADMs) that optically communicate (e.g., traffic) with customer devices (e.g., computation or communication devices), other access sites 110, and/or distribution site 120.

Distribution site 120 may include one or more network devices, or other types of computation or communication devices, that gather, process, search, and/or provide information in a manner described herein. For example, distribution site 120 may include one or more network devices that enable traffic (e.g., customer traffic) to be communicated to or from one or more access sites 110. In one example implementation, distribution site 120 may include one or more ROADMs that optically communicate (e.g., transfer traffic) with one or more access sites 110. Distribution site 120 may aggregate traffic from a particular area (e.g., areas encompassed by access sites 110), may aggregate traffic from access sites 110, and may communicate with an Internet protocol (IP) backbone.

In one example implementation, access site 110-1 may establish first and second Ethernet LAGs, and may create a first OCh LAG subpath from the first Ethernet LAG, via access site 110-2, to an Ethernet LAG at access site 110-3. Access site 110-1 may create a second OCh LAG subpath from the first Ethernet LAG, via distribution site 120, to the Ethernet LAG at access site 110-3, and may create a first ODUk LAG subpath from the second Ethernet LAG to an Ethernet LAG at access site 110-2. Access site 110-1 may also create a second ODUk LAG subpath from the second Ethernet LAG, via distribution site 120 and access site 110-3, to the Ethernet LAG at access site 110-2. If information (e.g., traffic) is received via the first Ethernet LAG, access site 110-1 may forward the information to access site 110-3 via the first or second OCh LAG subpath. If information (e.g., transfer traffic) is received via the second Ethernet LAG, access site 110-1 may forward the information to access site 110-2 via the first or second ODUk LAG subpath.

Although FIG. 1 shows example components of network 100, in other implementations, network 100 may contain fewer components, different components, differently arranged components, or additional components than depicted in FIG. 1.

FIG. 2 is a diagram of example components of access site 110 or distribution site 120. As illustrated, access site 110/distribution site 120 may include one or more network devices 200-1, . . . , 200-N (collectively referred to as "network devices 200," or, in some instances, singularly as "network device 200").

Network device 200 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic. In one example, network device 200 may include a device that is capable of transmitting information to and/or receiving information from other access sites 110 and/or distribution site 120. In one example implementation, network device 200 may include a ROADM that optically communicates (e.g., traffic) with customer devices (e.g., computation or communication devices), other network devices 200, other access sites 110, and/or distribution site 120.

Although FIG. 2 shows example components of access site 110/distribution site 120, in other implementations, access site 110/distribution site 120 may contain fewer components, different components, differently arranged components, or additional components than depicted in FIG. 2. Alternatively, or additionally, one or more components of access site 110/distribution site 120 may perform one or more other tasks described as being performed by one or more other components of access site 110/distribution site 120.

Figure 3:
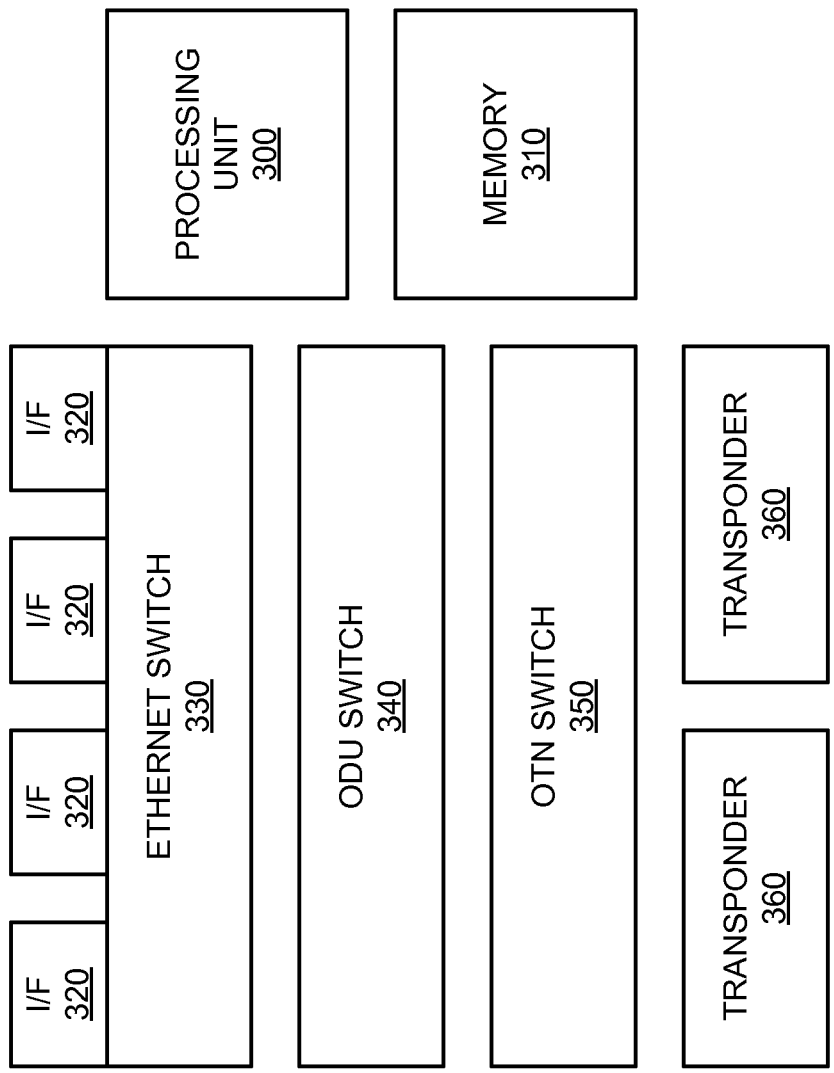
FIG. 3 is a diagram of example components of a network device illustrated in FIG. 2.

FIG. 3 is a diagram of example components of network device 200, when network device 200 corresponds to a ROADM. A ROADM may include a form of an OADM that adds the ability to remotely switch traffic from a wavelength-division multiplexing (WDM) system at a wavelength layer. The ROADM may achieve this through use of a wavelength-selective switching module. The wavelength-selective switching module may permit individual or multiple wavelengths carrying data channels to be added and/or dropped from a transport fiber without the need to convert signals on all of the WDM channels to electronic signals and back again to optical signals.

As illustrated in FIG. 3, network device 200 may include a processing unit 300, a memory 310, multiple interfaces (I/F) 320, an Ethernet switch 330, an optical data unit (ODU) switch 340, an optical transport network (OTN) switch 350, and multiple transponders 360. Components of network device 200 may interconnect via wired or wireless connections.

Processing unit 300 may include one or more processors or microprocessors that interpret and execute instructions. In other implementations, processing unit 300 may be implemented as or include one or more ASICs, FPGAs, or the like.

Memory 310 may include a RAM or another type of dynamic storage device that stores information and instructions for execution by processing unit 300, a ROM or another type of static storage device that stores static information and instructions for the processing unit 300, and/or some other type of magnetic or optical recording medium and its corresponding drive for storing information and/or instructions.

Interface 320 may be a point of attachment for physical links (e.g., optical fibers) and may be a point of entry for incoming traffic or a point of exit for outgoing traffic (e.g., to customer computation or communication devices). For example, interface 320 may send (e.g., may be an exit point) and/or receive (e.g., may be an entry point) traffic. In one example implementation, each of interfaces 320 may correspond to a 10 gigabit Ethernet (10GE) interface.

Ethernet switch 330 may include a component that interconnects network device 200 in an Ethernet network. In one example, Ethernet switch 330 may be an unmanaged component with no configuration capability. In another example, Ethernet switch 330 may be a managed component that may be configured into virtual local area networks (VLANs). Port bandwidths may be adjusted in a managed Ethernet switch, and a spanning tree protocol may be enabled in a managed Ethernet switch. In other implementations, Ethernet switch 330 may be replaced with other types of optical switches, such as a Synchronous Optical Networking (SONET) switch, a Synchronous Digital Hierarchy (SDH) switch, etc.

ODU switch 340 may include a component that enables optical signals to be selectively switched between Ethernet switch 330 and transponders 360. ODU switch 340 may provide switching functions, such as a Time Slot Interchange (TSI) function of SONET.

OTN switch 350 may include a component that enables optical signals to be selectively switched between transponders 360. OTN switch 350 may provide switching functions, such as a TSI function of SONET.

Transponder 360 may include a component that receives an optical signal, processes the optical signal, and re-transmits the optical signal at a particular frequency and wavelength. Transponders 360 may communicate with other components of network device 200, other network devices 200, other access sites 110, and/or distribution site 120.

As described herein, network device 200 may perform certain operations in response to processing unit 300 executing software instructions contained in a computer-readable medium, such as memory 310. A computer-readable medium may be defined as a non-transitory memory device. A memory device may include space within a single physical memory device or spread across multiple physical memory devices. The software instructions may be read into memory 310 from another computer-readable medium or from another device via a communication interface (e.g., interface 320). The software instructions contained in memory 310 may cause processing unit 300 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of network device 200, in other implementations, network device 200 may contain fewer components, different components, differently arranged components, or additional components than depicted in FIG. 3. Alternatively, or additionally, one or more components of network device 200 may perform one or more other tasks described as being performed by one or more other components of network device 200.

Figure 4:
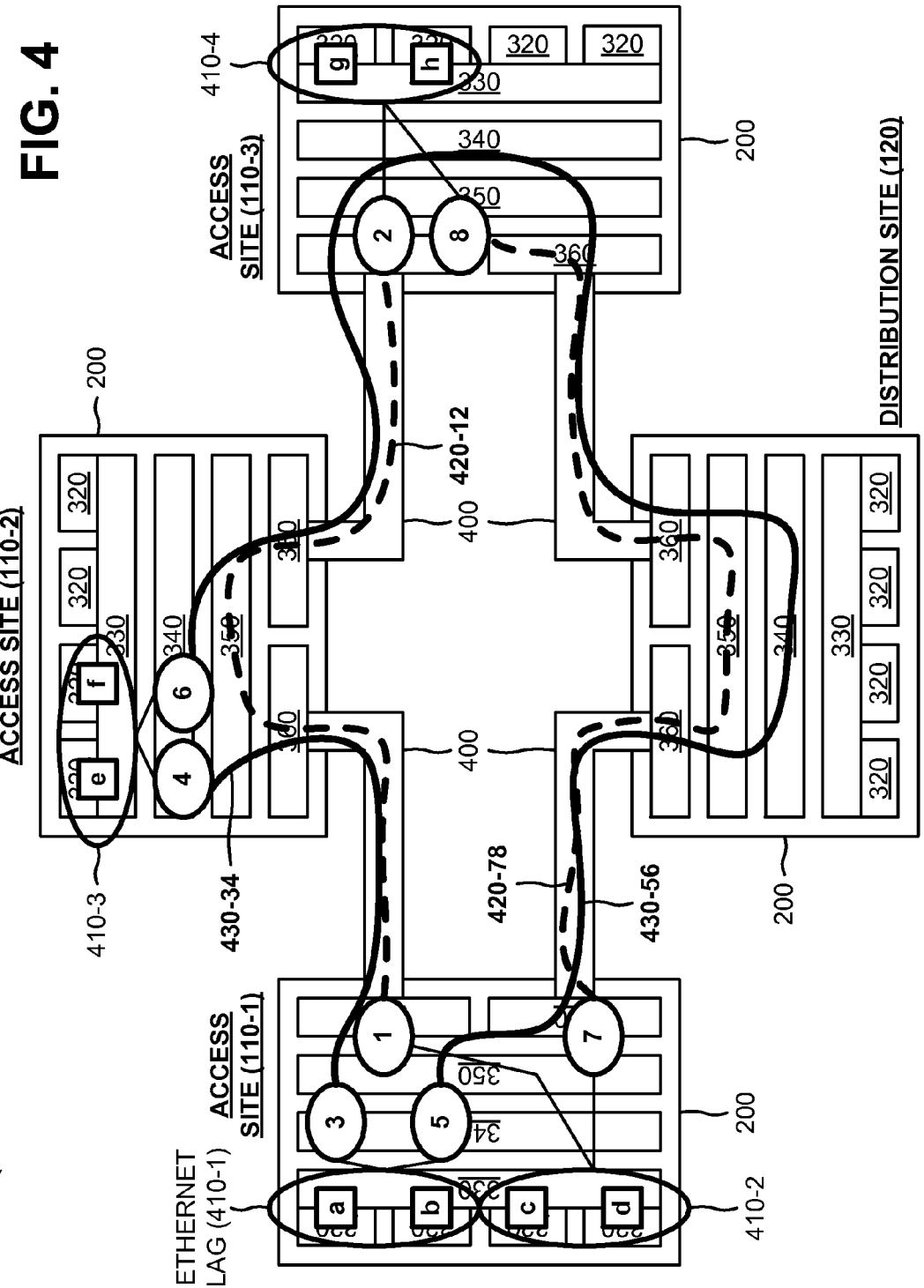
FIG. 4 is a diagram of example operations capable of being performed by an example portion of the network illustrated in FIG. 1.

FIG. 4 is a diagram of example operations capable of being performed by an example portion 400 of network 100. As shown, example network portion 400 may include access sites 110-1, 110-2, and 110-3, distribution site 120, and network devices 200. Access sites 110-1, 110-2, and 110-3, distribution site 120, and network devices 200 may include the features described above in connection with, for example, one or more of FIGS. 1-3. Network devices 200 (e.g., via transponders 360) of access sites 110 and distribution site 120 may physically interconnect via optical communication media 400 (e.g., optical fibers).

As further shown in FIG. 4, network device 200 of access site 110-1 may establish a first Ethernet LAG 410-1 with two interfaces 320 (e.g., marked as "a" and "b") associated with Ethernet switch 330. Network device 200 of access site 110-1 may establish a second Ethernet LAG 410-2 with two different interfaces 320 (e.g., marked as "c" and "d") associated with Ethernet switch 330. Network device 200 of access site 110-2 may establish an Ethernet LAG 410-3 with two interfaces 320 (e.g., marked as "e" and "f") associated with Ethernet switch 330. Network device 200 of access site 110-3 may establish an Ethernet LAG 410-4 with two interfaces 320 (e.g., marked as "g" and "h") associated with Ethernet switch 330. Each of Ethernet LAGs 410-1 through 410-4 may include a Layer 2 transport abstraction that may aggregate any Ethernet interface (e.g., interfaces 320) to create one logical combined Ethernet point-to-point connection.

As further shown in FIG. 4, multiple LAGs may be created at various OTN layers. For example, an optical channel (OCh) LAG, which includes two OCh LAG subpaths, may be created between network device 200 of access site 110-1 and network device 200 of access site 110-3. The OCh LAG may include an OCh transport abstraction that may aggregate any OCh path to create one logical OCh point-to-point connection. A first OCh LAG subpath 420-12 of the OCh LAG may begin at network device 200 of access site 110-1 (e.g., at a point marked "1" associated with OTN switch 350); may traverse network device 200 of access site 110-2, via optical bypass (e.g., network device 200 of access site 110-2 may not process wavelengths of optical signals); and may terminate at network device 200 of access site 110-3 (e.g., at a point marked "2" associated with OTN switch). First OCh LAG subpath 420-12 may map Ethernet LAG 410-1 (e.g., marked as "a" and "b") to Ethernet LAG 410-4 (e.g., marked as "g" and "h"). A second OCh LAG subpath 420-78 of the OCh LAG may begin at network device 200 of access site 110-1 (e.g., at a point marked "7" associated with OTN switch 350); may traverse network device 200 of distribution site 120, via optical bypass (e.g., network device 200 of distribution site 120 may not process wavelengths of optical signals); and may terminate at network device 200 of access site 110-3 (e.g., at a point marked "8" associated with OTN switch 350). Second OCh LAG subpath 420-78 may map Ethernet LAG 410-1 (e.g., marked as "a" and "b") to Ethernet LAG 410-4 (e.g., marked as "g" and "h").

When information (e.g., optical signals, such as an ODUk container) is provided to the OCh LAG (e.g., via Ethernet LAG 410-1), network device 200 of access site 110-1 may determine (e.g., based on a hash value, a round robin, or some other technique) whether to forward the information (e.g., a payload of the information) to network device 200 of access site 110-3 via first OCh LAG subpath 420-12 or second OCh LAG subpath 420-78. Once network device 200 of access site 110-1 determines the OCh LAG subpath, network device 200 of access site 110-1 may forward the information to network device 200 of access site 110-3 via the determined OCh LAG subpath. Accordingly, the information may be passed from Ethernet LAG 410-1 to Ethernet LAG 410-4.

As further shown in FIG. 4, an optical data unit (ODUk) LAG, which includes two ODUk LAG subpaths, may be created between network device 200 of access site 110-1 and network device 200 of access site 110-2. The ODUk LAG may include an ODUk transport abstraction that may aggregate any ODUk path to create one logical ODUk point-to-point connection. A first ODUk LAG subpath 430-34 of the ODUk LAG may begin at network device 200 of access site 110-1 (e.g., at a point marked "3" associated with ODU switch 340), and may terminate at network device 200 of access site 110-2 (e.g., at a point marked "4" associated with ODU switch 340). First ODUk LAG subpath 430-34 may map Ethernet LAG 410-1 (e.g., marked as "a" and "b") to Ethernet LAG 410-3 (e.g., marked as "e" and "f"). A second ODUk LAG subpath 430-56 of the ODUk LAG may begin at network device 200 of access site 110-1 (e.g., at a point marked "5" associated with ODU switch 340); may traverse network devices 200 of distribution site 120 and access site 110-3, via optical bypass (e.g., network devices 200 of distribution site 120 and access site 110-3 may not process wavelengths of optical signals); and may terminate at network device 200 of access site 110-2 (e.g., at a point marked "6" associated with ODU switch 340). Second ODUk LAG subpath 430-56 may map Ethernet LAG 410-1 (e.g., marked as "a" and "b") to Ethernet LAG 410-3 (e.g., marked as "e" and "f").

When information (e.g., optical signals, such as an Ethernet frame) is provided to the ODUk LAG (e.g., via Ethernet LAG 410-1), network device 200 of access site 110-1 may determine (e.g., based on a hash value, a round robin, or some other technique) whether to forward the information (e.g., a payload of the information) to network device 200 of access site 110-2 via first ODUk LAG subpath 430-34 or second ODUk LAG subpath 430-56. Once network device 200 of access site 110-1 determines the ODUk LAG subpath, network device 200 of access site 110-1 may forward the information to network device 200 of access site 110-2 via the determined ODUk LAG subpath. Accordingly, the information may be passed from Ethernet LAG 410-1 to Ethernet LAG 410-3.

In one example implementation, Ethernet LAGs 410-1 and 410-2 may map onto an ODUk container (e.g., an ODUk container may include a payload envelope that carries signals in a substantially bit-transparent manner), and the ODUk container may map to the OTN.

The provision of the OCh and ODUk LAGs depicted in FIG. 4 and the mapping of Ethernet LAGs based on the OCh and ODUk LAGs may create a flexible transport framework that decouples one layer from another. For example, the flexible transport framework may decouple the OCh layer (e.g., which is entirely optical) from the ODUk layer (e.g., which performs electrical conversion). The arrangement depicted in FIG. 4 may also permit independent scaling or contracting (e.g., of an OTN) by only exposing a LAG endpoint to adjacent transport layers. The arrangement of FIG. 4 may further provide a variety of options for constructing the transport layer, as described below in the examples of FIGS. 5 and 6.

Although FIG. 4 shows example components of network portion 400, in other implementations, network portion 400 may contain fewer components, different components, differently arranged components, or additional components than depicted in FIG. 4. Alternatively, or additionally, one or more components of network portion 400 may perform one or more other tasks described as being performed by one or more other components of network portion 400.

Figure 5:
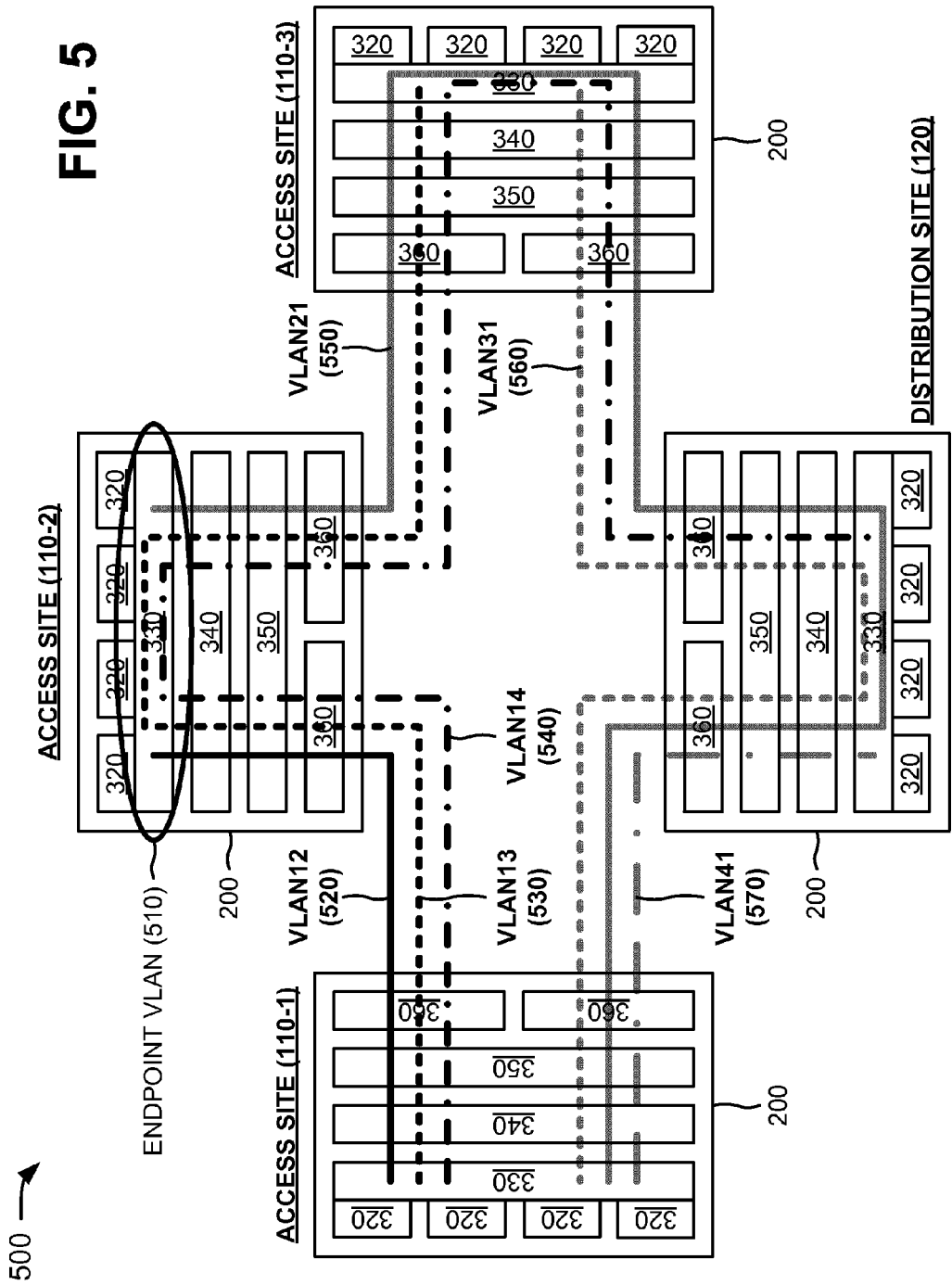
FIG. 5 is a diagram of example operations capable of being performed by another example portion of the network illustrated in FIG. 1.

FIG. 5 is a diagram of example operations capable of being performed by another example portion 500 of network 100. As shown, example network portion 500 may include access sites 110-1, 110-2, and 110-3, distribution site 120, and network devices 200. Access sites 110-1, 110-2, and 110-3, distribution site 120, and network devices 200 may include the features described above in connection with, for example, one or more of FIGS. 1-4. Network devices 200 (e.g., via transponders 360) of access sites 110 and distribution site 120 may physically interconnect via optical communication media 400 (e.g., optical fibers), not shown in FIG. 5 for clarity.

In one example implementation, network portion 500 may depict a Layer 2 (or Data Link Layer) transit switching approach with point-to-point wavelength transport. As further shown in FIG. 5, a variety of VLANs may be provided for network portion 500. A VLAN may include a group of devices with a common set of requirements that communicate as if the devices were attached to the same broadcast domain, regardless of the physical locations of the devices. A VLAN may include the same attributes as a physical LAN, but a VLAN may permit ports to be grouped together even if the ports are not located on the same network device. The VLANs of network portion 500 may be multiplexed onto an ODUk container or an OTN LAG (e.g., the OCh and ODUk LAGs depicted in FIG. 4), and may be mapped to a particular wavelength.

In one example, an endpoint VLAN 510 may be provided at network device 200 (e.g., at Ethernet switch 330) of access site 110-2. Transit traffic provided at endpoint VLAN 510 may be Layer 2 switched. A VLAN (e.g., VLAN12) 520 may be provided from network device 200 of access site 110-1 to network device 200 of access site 110-2, and may connect access site 110-1 to access site 110-2. Another VLAN (e.g., VLAN13) 530 may be provided from network device 200 of access site 110-1 to network device 200 of access site 110-3, via network device 200 of access site 110-2. VLAN 530 may connect access site 110-1 to access site 110-3. Still another VLAN (e.g., VLAN14) 540 may be provided from network device 200 of access site 110-1 to network device 200 of distribution site 120, via network devices 200 of access site 110-2 and access site 110-3. VLAN 540 may connect access site 110-1 to distribution site 120.

As further shown in FIG. 5, a VLAN (e.g., VLAN21) 550 may be provided from network device 200 of access site 110-2 to network device 200 of access site 110-1, via network devices 200 of access site 110-3 and distribution site 120. VLAN 550 may connect access site 110-2 to access site 110-1. Another VLAN (e.g., VLAN31) 560 may be provided from network device 200 of access site 110-3 to network device 200 of access site 110-1, via network device 200 of distribution site 120. VLAN 560 may connect access site 110-3 to access site 110-1. Still another VLAN (e.g., VLAN41) 570 may be provided from network device 200 of distribution site 120 to network device 200 of access site 110-1, and may connect distribution site 120 to access site 110-1.

Although FIG. 5 shows example components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500.

Figure 6:
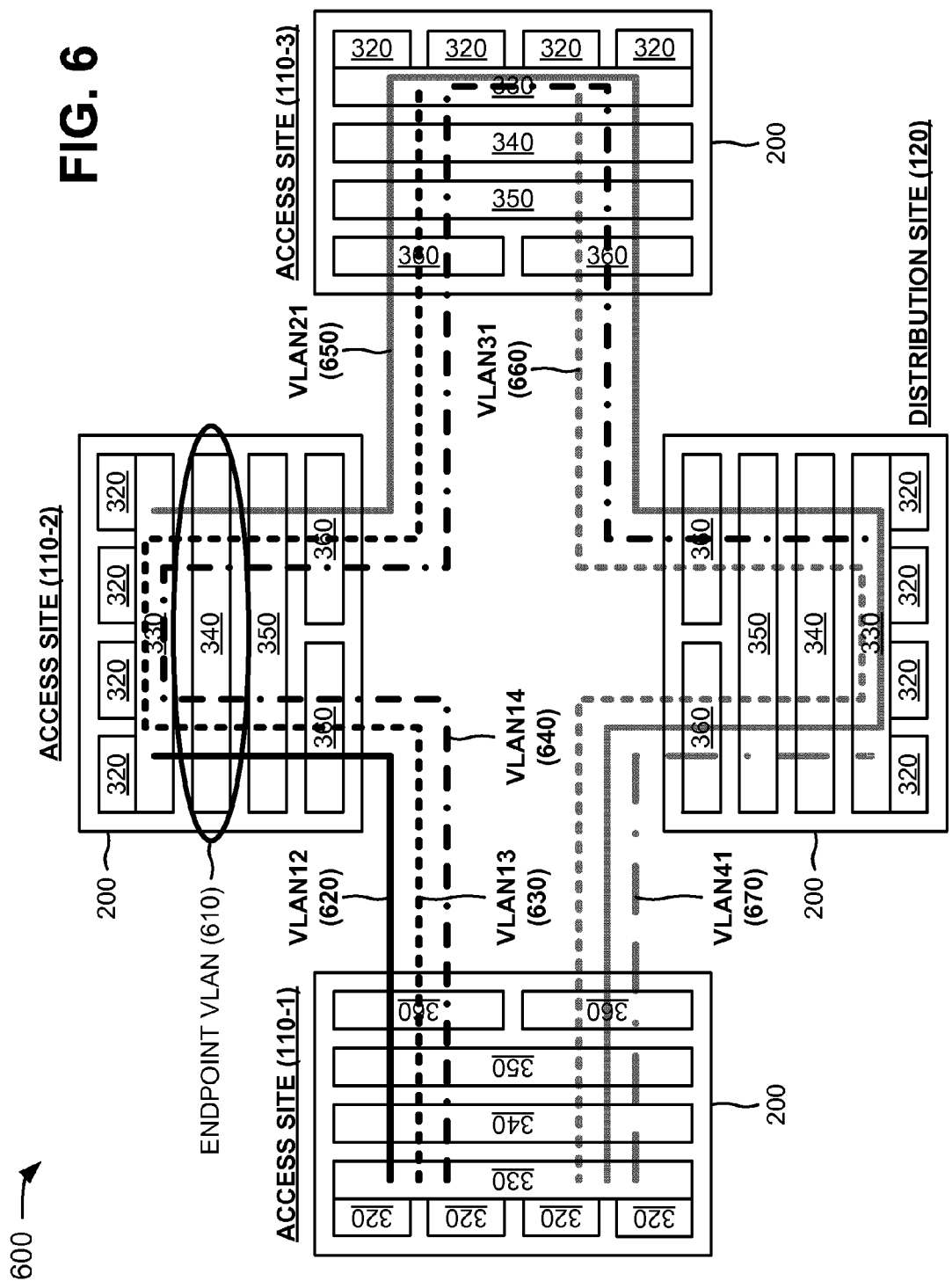
FIG. 6 is a diagram of example operations capable of being performed by still another example portion of the network illustrated in FIG. 1.

FIG. 6 is a diagram of example operations capable of being performed by still another example portion 600 of network 100. As shown, example network portion 600 may include access sites 110-1, 110-2, and 110-3, distribution site 120, and network devices 200. Access sites 110-1, 110-2, and 110-3, distribution site 120, and network devices 200 may include the features described above in connection with, for example, one or more of FIGS. 1-5. Network devices 200 (e.g., via transponders 360) of access sites 110 and distribution site 120 may physically interconnect via optical communication media 400 (e.g., optical fibers), not shown in FIG. 6 for clarity.

In one example implementation, network portion 600 may depict an ODUk layer transit switching approach with point-to-point ODUk transport. As further shown in FIG. 6, a variety of VLANs may be provided for network portion 600. The VLANs of network portion 600 may map to an ODUk container, and the ODUk layer may decide to transmit or drop a VLAN based on the ODUk container. ODUk containers may coalesce at transit using ODUflex (e.g., a lower order ODU container of the OTN hierarchy).

In one example, an endpoint VLAN 610 may be provided at network device 200 (e.g., at ODU switch 340) of access site 110-2. Transit traffic provided at endpoint VLAN 610 may be ODU multiplexed with ODUflex and switched. A VLAN (e.g., VLAN12) 620 may be provided from network device 200 of access site 110-1 to network device 200 of access site 110-2, and may connect access site 110-1 to access site 110-2. Another VLAN (e.g., VLAN13) 630 may be provided from network device 200 of access site 110-1 to network device 200 of access site 110-3, via network device 200 of access site 110-2. VLAN 630 may connect access site 110-1 to access site 110-3. Still another VLAN (e.g., VLAN14) 640 may be provided from network device 200 of access site 110-1 to network device 200 of distribution site 120, via network devices 200 of access site 110-2 and access site 110-3. VLAN 640 may connect access site 110-1 to distribution site 120.

As further shown in FIG. 6, a VLAN (e.g., VLAN21) 650 may be provided from network device 200 of access site 110-2 to network device 200 of access site 110-1, via network devices 200 of access site 110-3 and distribution site 120. VLAN 650 may connect access site 110-2 to access site 110-1. Another VLAN (e.g., VLAN31) 660 may be provided from network device 200 of access site 110-3 to network device 200 of access site 110-1, via network device 200 of distribution site 120. VLAN 660 may connect access site 110-3 to access site 110-1. Still another VLAN (e.g., VLAN41) 670 may be provided from network device 200 of distribution site 120 to network device 200 of access site 110-1, and may connect distribution site 120 to access site 110-1.

Although FIG. 6 shows example components of network portion 600, in other implementations, network portion 600 may contain fewer components, different components, differently arranged components, or additional components than depicted in FIG. 6. Alternatively, or additionally, one or more components of network portion 600 may perform one or more other tasks described as being performed by one or more other components of network portion 600.

Figure 7B:
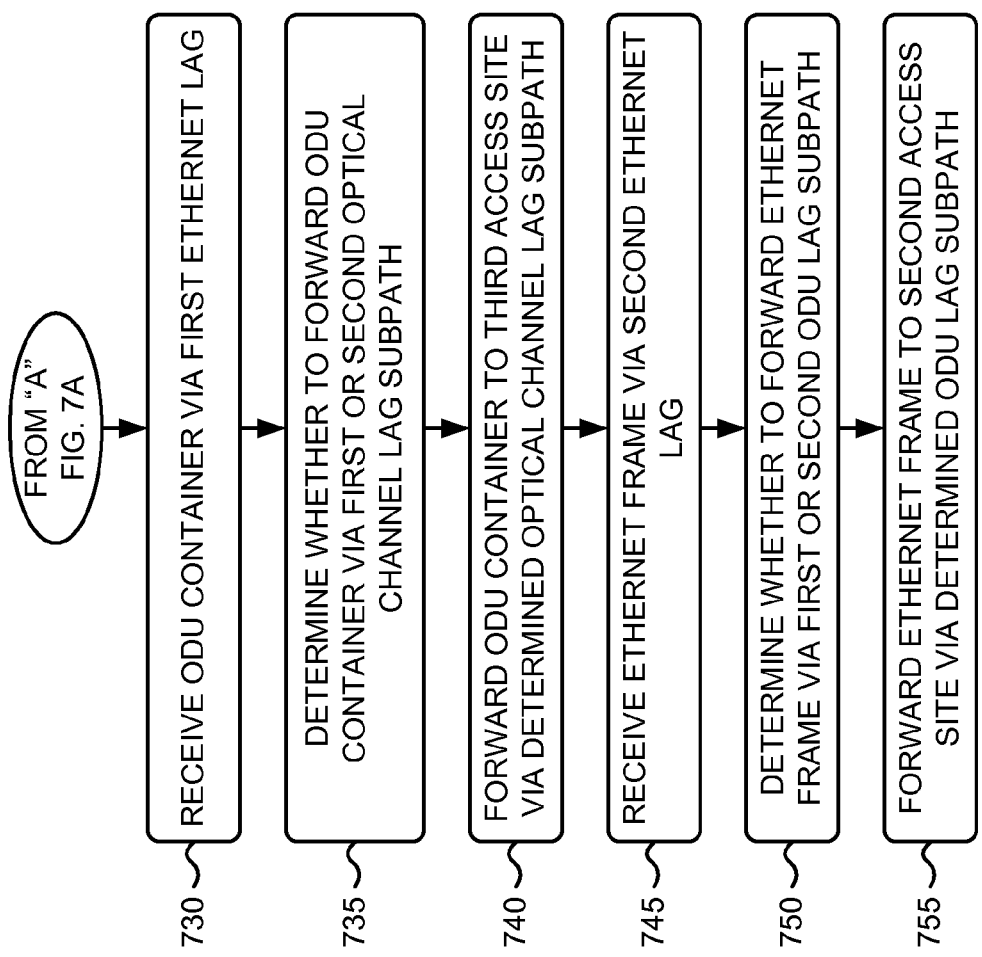

FIGS. 7A and 7B depict a flow chart of an example process 700 for optical transport network decoupling using optical data unit and optical channel link aggregation groups according to implementations described herein. In one implementation, process 700 may be performed by network device 200 (e.g., of a particular access site 110). In another implementation, some or all of process 700 may be performed by another device or group of devices, including or excluding network device 200.

As shown in FIG. 7A, process 700 may include establishing first and second Ethernet LAGs at a first access site (block 705), and creating a first optical channel LAG subpath from the first Ethernet LAG, via a second access site, to an Ethernet LAG at a third access site (block 710). For example, in implementations described above in connection with FIG. 4, network device 200 of access site 110-1 may establish first Ethernet LAG 410-1 with two interfaces 320 (e.g., marked as "a" and "b") associated with Ethernet switch 330. Network device 200 of access site 110-1 may establish second Ethernet LAG 410-2 with two different interfaces 320 (e.g., marked as "c" and "d") associated with Ethernet switch 330. Network device 200 of access site 110-2 may establish Ethernet LAG 410-3 with two interfaces 320 (e.g., marked as "e" and "f") associated with Ethernet switch 330. Network device 200 of access site 110-3 may establish Ethernet LAG 410-4 with two interfaces 320 (e.g., marked as "g" and "h") associated with Ethernet switch 330. First OCh LAG subpath 420-12 of the OCh LAG may begin at network device 200 of access site 110-1 (e.g., at a point marked "1" associated with OTN switch 350); may traverse network device 200 of access site 110-2, via optical bypass (e.g., network device 200 of access site 110-2 may not process wavelengths of optical signals); and may terminate at network device 200 of access site 110-3 (e.g., at a point marked "2" associated with OTN switch 350). First OCh LAG subpath 420-12 may map Ethernet LAG 410-1 (e.g., marked as "a" and "b") to Ethernet LAG 410-4 (e.g., marked as "g" and "h").

As further shown in FIG. 7A, process 700 may include creating a second optical channel LAG subpath from the first Ethernet LAG, via a distribution site, to the Ethernet LAG at the third access site (block 715), and creating a first ODU LAG subpath from the second Ethernet LAG to an Ethernet LAG at the second access site (block 720). For example, in implementations described above in connection with FIG. 4, second OCh LAG subpath 420-78 of the OCh LAG may begin at network device 200 of access site 110-1 (e.g., at a point marked "7" associated with OTN switch 350); may traverse network device 200 of distribution site 120, via optical bypass (e.g., network device 200 of distribution site 120 may not process wavelengths of optical signals); and may terminate at network device 200 of access site 110-3 (e.g., at a point marked "8" associated with OTN switch 350). Second OCh LAG subpath 420-78 may map Ethernet LAG 410-1 (e.g., marked as "a" and "b") to Ethernet LAG 410-4 (e.g., marked as "g" and "h"). First ODUk LAG subpath 430-34 of the ODUk LAG may begin at network device 200 of access site 110-1 (e.g., at a point marked "3" associated with ODU switch 340), and may terminate at network device 200 of access site 110-2 (e.g., at a point marked "4" associated with ODU switch 340). First ODUk LAG subpath 430-34 may map Ethernet LAG 410-1 (e.g., marked as "a" and "b") to Ethernet LAG 410-3 (e.g., marked as "e" and "f").

Returning to FIG. 7A, process 700 may include creating a second ODU LAG subpath from the second Ethernet LAG, via the distribution site and the third access site, to the Ethernet LAG at the second access site (block 725). For example, in implementations described above in connection with FIG. 4, second ODUk LAG subpath 430-56 of the ODUk LAG may begin at network device 200 of access site 110-1 (e.g., at a point marked "5" associated with ODU switch 340); may traverse network devices 200 of distribution site 120 and access site 110-3, via optical bypass (e.g., network devices 200 of distribution site 120 and access site 110-3 may not process wavelengths of optical signals); and may terminate at network device 200 of access site 110-2 (e.g., at a point marked "6" associated with ODU switch 340). Second ODUk LAG subpath 430-56 may map Ethernet LAG 410-1 (e.g., marked as "a" and "b") to Ethernet LAG 410-3 (e.g., marked as "e" and "f").

As shown in FIG. 7B, process 700 may include receiving an ODU container via the first Ethernet LAG (block 730), determining whether to forward the ODU container via the first or second optical channel LAG subpath (block 735), and forwarding the ODU container to the third access site via the determined optical channel LAG subpath (block 740). For example, in implementations described above in connection with FIG. 4, when information (e.g., optical signals, such as an ODUk container) is provided to the OCh LAG (e.g., via Ethernet LAG 410-1), network device 200 of access site 110-1 may determine (e.g., based on a hash value, a round robin, or some other technique) whether to forward the information (e.g., a payload of the information) to network device 200 of access site 110-3 via first OCh LAG subpath 420-12 or second OCh LAG subpath 420-78. Once network device 200 of access site 110-1 determines the OCh LAG subpath, network device 200 of access site 110-1 may forward the information to network device 200 of access site 110-3 via the determined OCh LAG subpath. Accordingly, the information may be passed from Ethernet LAG 410-1 to Ethernet LAG 410-4.

As further shown in FIG. 7B, process 700 may include receiving an Ethernet frame via the second Ethernet LAG (block 745), determining whether to forward the Ethernet frame via the first or second ODU LAG subpath (block 750), and forwarding the Ethernet frame to the second access site via the determined ODU LAG subpath (block 755). For example, in implementations described above in connection with FIG. 4, when information (e.g., optical signals, such as an Ethernet frame) is provided to the ODUk LAG (e.g., via Ethernet LAG 410-1), network device 200 of access site 110-1 may determine (e.g., based on a hash value, a round robin, or some other technique) whether to forward the information (e.g., a payload of the information) to network device 200 of access site 110-2 via first ODUk LAG subpath 430-34 or second ODUk LAG subpath 430-56. Once network device 200 of access site 110-1 determines the ODUk LAG subpath, network device 200 of access site 110-1 may forward the information to network device 200 of access site 110-2 via the determined ODUk LAG subpath. Accordingly, the information may be passed from Ethernet LAG 410-1 to Ethernet LAG 410-3.

Systems and/or methods described herein may provide optical transport network (OTN) decoupling using ODUk and OCh LAGS. The systems and/or methods may simplify construction of an OTN via the OCh and ODUk LAGs, which may prevent expansion and contraction of each layer of the OTN from having an impact on adjacent OTN layers, and may reduce tight coupling between OTN layers.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 7A and 7B, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a network device located at a first access site of an optical transport network, the method comprising:
    establishing, by the network device, a first Ethernet link aggregation group (LAG) at the first access site;
    establishing, by the network device, a second Ethernet LAG at the first access site;
    creating, by the network device, a first optical channel (OCh) LAG subpath from the first Ethernet LAG, via a second access site of the optical transport network, to an Ethernet LAG at a third access site of the optical transport network;
    creating, by the network device, a second OCh LAG subpath from the first Ethernet LAG, via a distribution site of the optical transport network, to the Ethernet LAG at the third access site;
    creating, by the network device, a first optical data unit (ODUk) LAG subpath from the second Ethernet LAG to an Ethernet LAG at the second access site; and
    creating, by the network device, a second ODUk LAG subpath from the second Ethernet LAG, via the distribution site and the third access site, to the Ethernet LAG at the second access site.

2. The method of claim 1, where the optical transport network includes a metropolitan optical transport network.

3. The method of claim 1, where the first and second OCh LAG subpaths map the first Ethernet LAG to the Ethernet LAG at the third access site.

4. The method of claim 1, where the first and second ODUk LAG subpaths map the second Ethernet LAG to the Ethernet LAG at the second access site.

5. The method of claim 1, where the network device includes a reconfigurable optical add-drop multiplexer (ROADM).

6. The method of claim 1, further comprising:
    receiving traffic via the first Ethernet LAG;
    determining whether to forward the traffic via the first OCh LAG subpath or the second OCh LAG subpath; and
    forwarding the traffic to the third access site via the determined one of the first OCh LAG subpath or the second OCh LAG subpath.

7. The method of claim 6, where the traffic includes at least one ODUk container.

8. The method of claim 1, further comprising:
    receiving traffic via the second Ethernet LAG;
    determining whether to forward the traffic via the first ODUk LAG subpath or the second ODUk LAG subpath; and
    forwarding the traffic to the second access site via the determined one of the first ODUk LAG subpath or the second ODUk LAG subpath.

9. The method of claim 8, where the traffic includes at least one Ethernet frame.

10. The method of claim 1, where the first and second OCh LAG subpaths and the first and second ODUk LAG subpaths decouple layers of the optical transport network.

11. A network device provided at a first access site of an optical transport network, the network device comprising:
    a memory to store a plurality of instructions; and
    a processor to execute instructions in the memory to:
        create a first Ethernet link aggregation group (LAG) at the first access site,
        create a second Ethernet LAG at the first access site,
        establish a first optical channel (OCh) LAG subpath from the first Ethernet LAG, via a second access site of the optical transport network, to an Ethernet LAG at a third access site of the optical transport network,
        establish a second OCh LAG subpath from the first Ethernet LAG, via a distribution site of the optical transport network, to the Ethernet LAG at the third access site,
        establish a first optical data unit (ODUk) LAG subpath from the second Ethernet LAG to an Ethernet LAG at the second access site, and
        establish a second ODUk LAG subpath from the second Ethernet LAG, via the distribution site and the third access site, to the Ethernet LAG at the second access site.

12. The network device of claim 11, where the optical transport network includes a metropolitan optical transport network.

13. The network device of claim 11, where the first and second OCh LAG subpaths map the first Ethernet LAG to the Ethernet LAG at the third access site.

14. The network device of claim 11, where the first and second ODUk LAG subpaths map the second Ethernet LAG to the Ethernet LAG at the second access site.

15. The network device of claim 11, where the network device includes a reconfigurable optical add-drop multiplexer (ROADM).

16. The network device of claim 11, where the processor is further to execute instructions in the memory to:
receive information via the first Ethernet LAG,
determine whether to forward the information via the first OCh LAG subpath or the second OCh LAG subpath, and
forward the information to the third access site via the determined one of the first OCh LAG subpath or the second OCh LAG subpath.

17. The network device of claim 16, where the information includes at least one ODUk container.

18. The network device of claim 11, where the processor is further to execute instructions in the memory to:
receiving information via the second Ethernet LAG;
determining whether to forward the information via the first ODUk LAG subpath or the second ODUk LAG subpath; and
forwarding the information to the second access site via the determined one of the first ODUk LAG subpath or the second ODUk LAG subpath.

19. The network device of claim 18, where the information includes at least one Ethernet frame.

20. One or more non-transitory computer-readable media storing instructions executable by one or more processors of a network device located at a first access site of an optical transport network, the media storing one or more instructions for:
establishing a first Ethernet link aggregation group (LAG) at the first access site;
establishing a second Ethernet LAG at the first access site;
creating a first optical channel (OCh) LAG subpath from the first Ethernet LAG, via a second access site of the optical transport network, to an Ethernet LAG at a third access site of the optical transport network;
creating a second OCh LAG subpath from the first Ethernet LAG, via a distribution site of the optical transport network, to the Ethernet LAG at the third access site;
creating a first optical data unit (ODUk) LAG subpath from the second Ethernet LAG to an Ethernet LAG at the second access site;
creating a second ODUk LAG subpath from the second Ethernet LAG, via the distribution site and the third access site, to the Ethernet LAG at the second access site;
receiving traffic via the first Ethernet LAG;
determining whether to forward the traffic via the first OCh LAG subpath or the second OCh LAG subpath;
forwarding the traffic to the third access site via the determined one of the first OCh LAG subpath or the second OCh LAG subpath;
receiving other traffic via the second Ethernet LAG;
determining whether to forward the other traffic via the first ODUk LAG subpath or the second ODUk LAG subpath; and
forwarding the other traffic to the second access site via the determined one of the first ODUk LAG subpath or the second ODUk LAG subpath.

* * * * *